R. L. GOODMAN.
CULTIVATOR FENDER.
APPLICATION FILED NOV. 6, 1914.
1,256,473.
Patented Feb. 12, 1918.
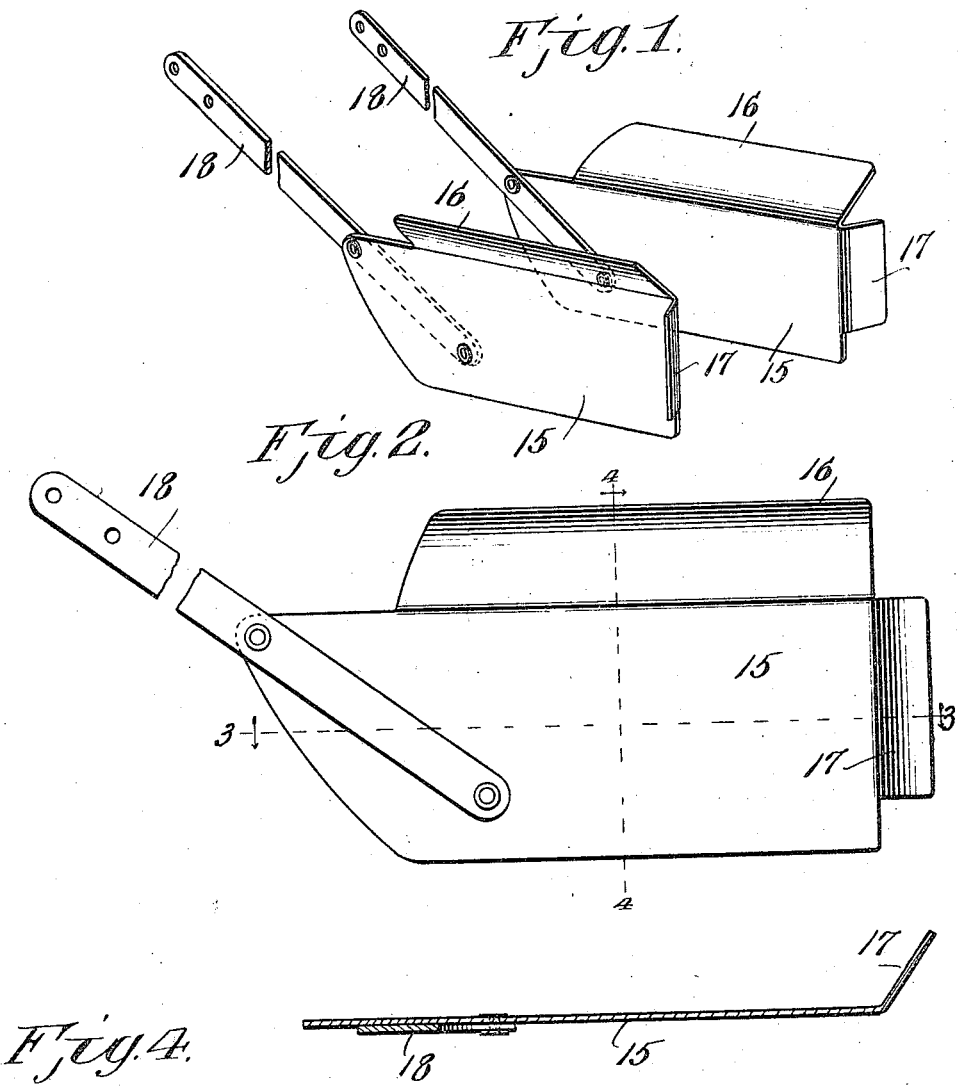
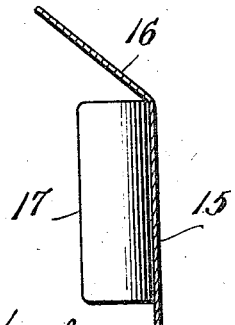
Witnesses
Frank Hough
Inventor
R. L. Goodman,
By Victor J. Evans
Attorney

UNITED STATES PATENT OFFICE.

ROY L. GOODMAN, OF STRAWBERRY POINT, IOWA.

CULTIVATOR-FENDER.

1,256,473.  Specification of Letters Patent.  Patented Feb. 12, 1918.

Application filed November 6, 1914. Serial No. 870,659.

*To all whom it may concern:*

Be it known that I, ROY L. GOODMAN, a citizen of the United States, residing at Strawberry Point, in the county of Clayton and State of Iowa, have invented new and useful Improvements in Cultivator-Fenders, of which the following is a specification.

This invention relates to cultivator fenders, and it has particular reference to fenders applicable to corn plows, cultivators and the like for the purpose of shielding the young plants that are being cultivated against injury by lumps of dirt rolling thereon and crushing the same.

The invention has for its object to produce a fender of simple and inexpensive construction having guards or flanges to prevent lumps of dirt and the like that are thrown up by the plows from jumping over the edge of the fender and falling on the plant with the result of crushing the same.

A further object of the invention is to produce a fender having guards or flanges at its upper and rear edges, the rear guard being raised above the lower edge of the fender blade so as to permit fine pulverized dirt to roll beneath said guard in the direction of the plant that is being cultivated.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a perspective view showing right and left fender blades constructed in accordance with the invention.

Fig. 2 is a side elevation showing the inner face of one of the fenders.

Fig. 3 is a sectional view taken on the line 3—3 in Fig. 2.

Fig. 4 is a sectional view taken on the line 4—4 in Fig. 2.

Corresponding parts in the several figures are denoted by like characters of reference.

The fender consists of a plate 15 of sheet metal having along its upper edge a guard consisting of a flange 16 which is bent outwardly at an angle of approximately 135 degrees more or less to the body of the plate. A similar flange 17 formed along the rear edge is also bent outward at an angle of approximately 135 degrees, more or less, to the body of the plate. This rear flange extends from the upper edge of the plate downwardly and terminates at a distance from the lower edge of the plate, the distance between the lower edge of the flange and the lower edge of the plate being from two to four inches, more or less. The plate 15 is provided with an upwardly and forwardly extending draft bar 18 whereby it may be connected with the frame of an ordinary corn plow or cultivator.

In practice, two fenders are used, the same being made right and left, as will be clearly seen by reference to Fig. 1, and the guard flanges of the respective fenders being turned outward with respect to the row of plants which passes between the fenders, the fenders being arranged adjacent to the inner faces of the plow or cultivator gangs. Lumps of dirt and the like which are loosened by the plows and which are frequently thrown in an upward direction will be intercepted by the top flanges 17 and will be thereby prevented from dropping between the fenders and thus injuring the young plants. In like manner, the rear guard flanges 17 will prevent loose lumps of dirt, stones and the like from rolling onto the young plants. Said rear flanges being elevated above the lower edges of the fender plates will not interfere with finely pulverized dirt rolling in the direction of the plants, covering the roots of the latter and providing proper nutriment and also covering and destroying young weed sprouts. The fenders of my improved construction may be produced at a very moderate expense and may be very readily applied to any conventional form of corn plow or cultivator.

Having thus described the invention, what is claimed as new, is:—

A cultivator shield comprising a pair of vertical parallel plates each having its rear edge at a right angle to the bottom edge and having its forward edge curved upwardly from the bottom edge to the top edge, the top and bottom edges of said plate being parallel, a flange extending outwardly and upwardly from said top edge and terminating short of the front edge and flush with said rear edge, and an outwardly and rearwardly inclined flange formed on said rear edge and terminating short of said bottom edge and flush with said top edge, said inclined top flanges directing inwardly lumps of earth falling upon them.

In testimony whereof I affix my signature in presence of two witnesses.

ROY L. GOODMAN.

Witnesses:
JOHN L. ALDERSON,
MILTON M. KELLOGG.

Copies of this patent may be obtained for five cents each, by addressing the "Commissioner of Patents, Washington, D. C."